United States Patent [19]

Ricciardi et al.

[11] Patent Number: 4,757,093

[45] Date of Patent: Jul. 12, 1988

[54] FLAME RETARDANT MELAMINE CONTAINING POLYURETHANE FOAM

[75] Inventors: Michael A. Ricciardi, Statesville, N.C.; Fred N. Teumac, Spartanburg, S.C.; Gregory W. Howard; Ronald L. Murph, both of Charlotte, N.C.

[73] Assignee: Reeves Brothers, Inc., Spartanburg, S.C.

[21] Appl. No.: 52,344

[22] Filed: May 21, 1987

[51] Int. Cl.$^4$ .............................................. C08G 18/14
[52] U.S. Cl. .................................... 521/107; 521/166; 521/168; 521/169
[58] Field of Search ................ 521/107, 166, 168, 169

[56] References Cited

U.S. PATENT DOCUMENTS

| | | | |
|---|---|---|---|
| 3,297,597 | 1/1967 | Edwards et al. | 260/2.5 |
| 3,341,482 | 9/1967 | Gmitter et al. | 260/2.5 |
| 3,399,151 | 8/1968 | Kaiser | 260/2.5 |
| 3,462,381 | 8/1969 | Eaton et al. | 260/2.5 |
| 3,622,526 | 11/1971 | Zorn | 260/2.5 AK |
| 3,681,273 | 8/1972 | Jelly | 260/2.5 |
| 3,726,835 | 4/1973 | Bertozzi | 260/75 NK |
| 3,803,063 | 4/1974 | Krentz, Jr. | 260/2.5 AJ |
| 3,824,239 | 7/1974 | Narayan et al. | 260/249.5 |
| 3,897,372 | 7/1975 | Kehr et al. | 260/2.5 AJ |
| 4,008,185 | 2/1977 | Olstowski | 260/2.5 AC |
| 4,042,537 | 8/1977 | Dahm et al. | 260/2.5 AP |
| 4,066,578 | 1/1978 | Murch et al. | 260/2.5 AG |
| 4,098,729 | 7/1978 | Kollmeier et al. | 521/128 |
| 4,137,626 | 1/1979 | Edwards et al. | 260/570.9 |
| 4,139,501 | 2/1979 | Rudner et al. | 521/136 |
| 4,143,029 | 3/1979 | Matthews et al. | 260/45.8 NT |
| 4,162,276 | 7/1979 | Rim et al. | 525/2 |
| 4,197,373 | 4/1980 | Miano et al. | 521/128 |
| 4,221,875 | 9/1980 | Yukuta et al. | 521/128 |
| 4,246,146 | 1/1981 | Woods et al. | 260/9 |
| 4,258,141 | 3/1981 | Jarre et al. | 521/114 |
| 4,293,657 | 10/1981 | Nissen et al. | 521/121 |
| 4,317,889 | 3/1982 | Pcolinsky, Jr. | 521/107 |
| 4,335,029 | 6/1982 | Dabi et al. | 524/589 |
| 4,369,258 | 1/1983 | Johnson | 521/107 |
| 4,374,207 | 2/1983 | Stone et al. | 521/107 |
| 4,374,209 | 2/1983 | Rowlands | 521/116 |
| 4,385,131 | 5/1983 | Fracalosi et al. | 521/55 |
| 4,387,194 | 6/1983 | Ottaviani et al. | 525/454 |
| 4,390,642 | 6/1983 | Smith | 521/112 |
| 4,421,868 | 12/1983 | Smith | 521/112 |
| 4,438,028 | 3/1984 | Schmittmann et al. | 252/609 |
| 4,451,622 | 5/1984 | DiDomenico, Jr. | 525/456 |
| 4,481,308 | 11/1984 | Gray | 521/120 |
| 4,485,195 | 11/1984 | Brennan et al. | 521/167 |
| 4,515,632 | 5/1985 | Maurer et al. | 106/18.16 |
| 4,579,876 | 4/1986 | Ilipulos | 521/136 |
| 4,617,286 | 10/1986 | Arai et al. | 502/167 |
| 4,644,015 | 2/1987 | Scaccia et al. | 521/252 |

FOREIGN PATENT DOCUMENTS

| | | |
|---|---|---|
| 2043917 | 3/1972 | Fed. Rep. of Germany . |
| 2348838 | 4/1975 | Fed. Rep. of Germany . |
| 3407007 | 8/1985 | Fed. Rep. of Germany . |
| 3411327 | 10/1985 | Fed. Rep. of Germany . |
| 1029963 | 5/1966 | United Kingdom . |
| 1030162 | 5/1966 | United Kingdom . |
| 1453258 | 10/1976 | United Kingdom . |
| 2094315 | 9/1982 | United Kingdom . |
| 2163762 | 5/1986 | United Kingdom . |

OTHER PUBLICATIONS

Hawley, *Condensed Chemical Dictionary*, 9th Ed, p. 403, 1977.
Ozawa et al., Effect of Various Additives on the Photo-degradation of Polyurethanes (1984).
Chemical Abstracts, 85(20) 144070a (1976).
Chemical Abstracts, 85(18) 125105z (1976).
Chemical Abstracts, 73(6) 26206d (1970).
Chemical Abstracts, 69(2) 3611k (1968).
Chemical Abstracts, 99(4) 23618r (1983).
Chemical Abstracts, 101(8) 56594t (1984).
Chemical Abstracts, 101(8) 56593s (1984).
"Fire-retardant flexible urethane foams debut," C&E News, Apr. 1, 1985, p. 18.
"A New Foam for Furniture," Chemical Week, 4/3/85, p. 10.
BASF Press Release, Pluracol Polyol C-133, 3/25/85.
BASF Technical Bulletin, Pluracol Polyol C-133, 3/85.
MCI Melamine Bulletin (1980).
BASF Technical Bulletin, Pluragard Melamine, (10/85).
BASF Melamine Modified Slab Foams (1986).
Solodovnik et al., Effect of Fillers on Physico-Mechanical Properties and Flammability of Polyurethane Foam (1983).
"Flame Retardancy Gain Seen" Chemical Marketing Reporter, Apr. 1, 1985, p. 3.
"Foams Show Improvement Over Time," Journal of Commerce, Wednesday, Mar. 27, 1985.

*Primary Examiner*—Maurice J. Welsh
*Attorney, Agent, or Firm*—Pennie & Edmonds

[57] ABSTRACT

Compositions and methods for providing a flexible flame retardant polyether polyurethane foam prepared from foam forming components of a polyether polyol, an organic isocyanate compound, water, a liquid phosphorus ester in an amount of about 4 to 10 parts by weight and melamine in an amount of 1 to 5 parts by weight, each based on 100 parts by weight of the polyether polyol in the composition. Between 15 and 500 percent by weight melamine is used to replace a minor portion of the amount of ester (i.e., less than half) which would normally be used to achieve substantially the same degree of flame retardance in the foam.

23 Claims, No Drawings

FLAME RETARDANT MELAMINE CONTAINING POLYURETHANE FOAM

TECHNICAL FIELD

The invention relates to flame retardant polyurethane foam-forming compositions and methods of forming polyurethane foam therefrom in which melamine is used to replace a portion of conventional liquid phosphorus ester flame retardant additives.

BACKGROUND ART

Polyurethane foam is prepared commercially in the form of large blocks that are subsequently cut into the desired shape for use in the manufacture of various articles that require a foam padding. It is well known that polyurethane foam requires time to cure and develop its full physical properties. In typical polyurethane foam formulations, a polyhydroxy material ("polyol"), water and an organic isocyanate compound are reacted in the presence of catalysts or other additives. Much of the time, a small percentage of terminal isocyanate groups are left unreacted in the foam structure. If the foam is distorted or compressed in this condition, it fails to recover its original dimensions when the distortive or compressive force is released. Normally, the terminal isocyanate groups that are left unreacted in the foam structure will react with the residual water in the foam structure or with the water vapor in the atmosphere over a period of several hours or days, and the foam will ultimately achieve its full physical properties.

As pointed out in the Encyclopedia of Polymer Science and Technology (John Wiley and Sons, New York 1969) in the section on Polyurethanes, polyethers are commercially the most important of the polyols used to prepare polyurethanes. At the present time, most of the polyethers used in the production of flexible polyurethane foams are derived from propylene oxide and ethylene oxide. In this preparation, propylene oxide is reacted with glycerol in the presence of a basic catalyst to form a poly(oxypropylene) homopolymer which is further reacted with ethylene oxide to form a block copolymer.

According to the prior art, melamine in relatively large quantities, i.e., above 20 to as high as 200 parts by weight based on 100 parts polyol, has been used in both flexible and rigid foams as a fire retardant additive, either alone or in combination with other materials such as silica, alumina, halogenated phosphorus ester compounds, and the like.

For example, British Patent Specification No. 2,094,315 discloses an intumescent, highly resilient polyether urethane foam prepared by reacting a polyether polyol, an organic polyisocyanate, a catalyst, a surface active agent, a blowing agent, an intumescent material, a carbonific element for forming a carbonaceous char by reaction with the acid liberated from the intumescent material, and optionally, a spumific element for generating non-flammable gases which contribute to the intumescence and to a reduction of the effects of flame on the surface of the resulting foam. Melamine is disclosed as a suitable spumific element, and the examples show the use of 10 or 20 parts melamine based on 100 parts polyol.

Another example of the use of melamine in flame-resistant flexible polyurethane foams is found in U.S. Pat. No. 4,258,141. These foams generally contain a specific aromatic isocyanate compound, a polyol, flame inhibitors, and blowing agents, with optional additions of chain extenders and other additives. The amount of melamine (or other cyanic acid derivative) ranges from 10 to 70 weight percent, preferably 20 to 50 weight percent, based on the weight of the aromatic polyisocyanates or mixtures of aromatic polyisocyanates.

Melamine has also been used as an additive to the foam forming components of other foams, such as polyester polyurethane foams and rigid foams.

U.S. Pat. No. 4,317,889 discloses flexible, resilient polyester polyurethane foams with substantially improved charforming or intumescent properties, obtained by adding to a conventional polyester polyurethane foam forming reaction mixture at least one melamine derivative, at least one flame retardant, and hydrated alumina. The amount of melamine derivative generally ranges from about 10 to 30 parts by weight based on 100 parts by weight of the polyester polyol.

Also, U.S. Pat. No. 3,897,372 discloses polyurethane foam compositions having flame retardancy and reduced smoke density formed by reacting specific polyisocyanate capped polyoxethylene glycol resin reactants with water. Melamine is added to these foam-forming compositions in an amount of between 1 and 200 parts by weight based on 100 parts by weight of the resin reactant, along with between 50 and 400 parts by weight of aluminum hydrate.

Rigid polyurethane foams which include melamine powder in an amount of between 20 and 100 parts by weight based on the weight of the polyhydroxyl compound are described in U.S. Pat. No. 4,221,875. Also, West German Pat. No. 2,348,838 discloses a method for flameproofing synthetic polyurethane materials by adding to a mixture of polyisocyanates, catalysts, polyols, foaming agents, and auxiliary agents, melamine as a flameproofing agent in an amount of between 2.5 and 50% by weight based on the total weight of the reaction mixture.

Rebond polyurethane foam compositions having melamine or urea incorporated therein are described in U.S. Pat. No. 4,385,131. These additives are included in an amount of between about 40 to 100 parts per 100 parts of polyurethane foam chips. The additives and foam chips are joined by a liquid binder to form flame retardant rebond foam articles.

U.S. Pat. No. 3,726,835 discloses that melamine or dicyandiamide can be utilized as a stabilizer for polyurethane prepolymers which are thereafter cured to form elastomeric polymers. In these compositions, 10 parts melamine or dicyandiamide is added to 100 parts prepolymer.

U.S. Pat. No. 4,374,207 discloses flexible, resilient, polyurethane foam having improved flame retardancy and intumescent properties prepared from a reaction mixture comprising a polyether polyol, an organic polyisocyanate, a blowing agent, a surfactant, a catalyst, a flame retardant and hydrated alumina, optionally with a char former of a melamine derivative.

U.S. Pat. Nos. 4,139,501 and 4,197,373 disclose polyether polyurethane foams containing, as a flame retardant additive, a melamine derivative, usually in amounts ranging from one to 20 weight percent of the polyol (in the '501 patent) and from 0.25 to 30 parts by weight based on 100 parts polyol in the '373 patent. The '501 patent also utilizes conventional halogenated esters in amounts ranging from 4 to 30 percent by weight of the polyol to further increase the flame retardance.

None of these references disclose the benefits of substituting small amounts of melamine for a portion of the conventional liquid phosphorous esters to maintain the desired flame retardance of the foam.

SUMMARY OF THE INVENTION

The present invention relates to a method for maintaining the flame retardant properties of a polyether polyurethane foam prepared from a polyurethane foam-forming composition comprising a polyether polyol, an organic isocyanate compound, water, and a liquid phosphorous ester flame retardant additive. This method includes the steps of replacing a minor portion of the liquid phosphorous ester with an amount of melamine which is less than that which would normally be necessary to achieve similar flame retardance if melamine alone is used. Melamine alone is not effective unless about 20 parts by weight based on 100 parts by weight polyol is used, while the effective amounts of ester generally ranges from about 5 to 10 parts.

In this invention, we have found that generally, between 1 and 6 parts of the ester can be replaced with between 1 and 5 parts melamine with no loss of flame retardant properties of the foam. Thus, the amount of melamine which is to replace part of the ester ranges from about 15 to 500 percent of the minor portion of the ester which is to be replaced. Preferably, the amount of melamine ranges from about 50 to 300 percent of the minor portion of the ester. "Minor portion" is used to mean less than half of the amount of flame retardant ester additive which would normally be used. Preferably, less than 33% or even less than 25% by weight of the total amount of ester additive is replaced with melamine. Thereafter, the foam is formed from the melamine containing foam-forming composition.

As noted above, about 1 to 6 parts of the ester, which is usually used in an amount of from 8 to 10 parts based on 100 parts polyol, are replaced with between about 1 and 5 parts of melamine. Optimum results are achieved when equal amounts of ester are replaced by the melamine, usually in an amount of about 1 to 3 parts and most preferably 2 parts i.e., 2 parts melamine for 2 parts ester.

The invention also relates to the polyurethane foam-forming compositions as well as to the flame retardant polyurethane foam prepared from such compositions and by the previously described methods.

DETAILED DESCRIPTION OF THE INVENTION

The objectives of this invention are accomplished by incorporating into the foam forming components of a flexible polyether polyurethane foam composition a small amount of melamine in place of a portion of the conventional liquid phosphorus ester flame retardant additive.

The term "polyether polyurethane" as used throughout this application refers to polyurethanes derived by polyether polyols. This class would include the poly(oxytetramethylene) glycols which are prepared by the polymerization of tetrahydrofuran. Poly(oxypropylene) triols are another important group of polyethers used in the manufacture of polyurethanes which are included in this class. These triols are prepared by the same general reactions as poly(oxypropylene) glycols. The polyurethanes derived from polyesters do not normally present post-curing problems and thus do not form part of this invention.

The term "organic isocyanate compound" is used to describe the isocyanate or polyisocyanate compounds that are suitable for use in this invention. Such organic isocyanate compounds include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene- 1,5-diisocyanate, 1-methoxyphenyl-2,4-diisocyanate, 4,4'-diphenylmethane diisocyanate, 4,4'-biphenylene diisocyanate, 3,3-dimethoxy-4,4'-biphenyl diisocyanate, 3,3'-dimethoxy-4,4'-biphenyl diisocyanate, 3,3'-dimethyl-4,4'biphenyl diisocyanate and 3,3',-dimethyldiphenylmethane-4,4'-diisocyanate; the triisocyanates such as 4,4',4" -triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanates. Especially useful due to their availability and properties are toluene diisocyanate, 4,4'-diphenylmethane diisocyanate and polymethylene polyphenylene polyisocyanate.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethane diamine. The preferred crude isocyanates are disclosed in U.S. Pat. No. 3,215,652.

The polyurethane foams employed in the present invention are generally prepared by the reaction of the polyether polyol with the organic isocyanate compound in the presence of a blowing agent such as water and, optionally, in the presence of additional polyhydroxylcontaining components, chain-extending agents, catalysts, surface-active agents, stabilizers, dyes, fillers and pigments. The preparation of cellular polyurethane plastic foam is well known in the art. Corresponding quantities of excess isocyanate compound are used to react with the blowing agent, generally water.

It is also possible to proceed with the preparation of the polyurethane by a prepolymer technique wherein an excess of the organic isocyanate compound is reacted in a first step with the polyol of the present invention to prepare a prepolymer having free isocyanate groups which is then reacted in a second step with water and/or additional polyols to prepare a foam. Alternatively, the components may be reacted in a single working step commonly known as the "one-shot" technique of preparing polyurethanes The invention principally relates to the discovery that melamine is capable of replacing a portion of the more expensive conventional flame retardant(s) in small amounts without reducing the flame retardant characteristics of the foam.

The most preferred form of melamine is as a powder, and any amounts in the range of about 1 to 5 parts by weight and preferably between 1 and 3 parts by weight based on 100 parts by weight of polyether polyol are suitable for replacing between 1 and 6 parts of conventional liquid phosphorus ester flame retardant agent. Amounts higher than 5 parts by weight of melamine based on 100 parts by weight of polyol used in conjunction with the reduced amounts of liquid phosphorus ester additive do not provide any further benefits since the cost of the formulation is increased and flame retardance is only slightly increased within acceptable limits.

Melamine powder is used due to its relatively low cost and availability. The particle size of the melamine powder is not critical to the invention and any particle size ranges between 1 and 100 microns is suitable. Two standard melamine powders have been found to be suitable: Pluragard ® melamine powder by BASF which has a particle size distribution of 60% of less than 44 microns and finely ground melamine powder by MCI, which has a particle size distribution of 90% less than 10 microns.

Suitable flame retardant additives for use in the composition of the invention include those which are conventionally used in the art of making flexible, flame retardant polyurethane foams. Such compounds are known generally as liquid phosphorus ester compounds, and would include tri-esters of phosphoric acid, halogenated triesters of phosphoric acid and the like.

Specific examples of such suitable flame retardants are: tris(1,3-dichloropropyl)phosphate, tris(2,3-dibromopropyl)-phosphate, 2,2-bis(chloromethyl)-1,3 propylene bis[di(2-chloroethyl)phosphate], tris(2-chloroethyl)phosphate, tris(2-chloroprophyl)phosphate, bis(dichloropropyl) tribromoneopentyl phosphate, tetrakis(2-chloroethyl) ethylene diphosphate (sold by Olin Chemicals as THERMOLIN ®101), FYROL ® EFF(oligomeric chloroalkyl phosphate, sold by Stauffer Chemical Co.), tricresyl phosphate, cresyl diphenyl phosphate, chlorinated paraffin, and brominated paraffin. Halogenated phosphates are generally preferred as flame retardant additives in polyether polyurethane foams of the invention, especially tris(1,3-dichloropropyl)phosphate, tris(2-chloroethyl)phosphate, FYROL ® EFF, and tetrakis(2-chloroethyl)ethylene diphosphate, with the first and last-named being particularly preferred.

It is also possible to utilize in this invention flame retardant additives which contain reactive hydroxyl groups in their structure, such as Vircol 82.

Although a single flame retardant additive is preferred from the standpoint of simplicity of formulation, mixtures of two or more of the same type or of different types may be found to give improved performance in some cases, and such mixtures may be included in the foams of this invention. The amount of flame retardant additive or mixture according to the prior art generally ranges from about 8 to about 10 parts by weight per 100 parts by weight of polyol in the foam forming composition, however, depending upon the specific compound used, the amounts could range from 5 to 20 parts by weight based on 100 parts by weight polyol or even more. In this invention, it is found advantageous to use from about 4 to about 8 parts by weight of the ester along with between 1 and 3 parts of melamine to achieve the desired flame retardance.

Other additives for forming the foam which may be incorporated into to these form foaming compositions are well known to those skilled in the art, and would include, for example, catalysts, chain extending agents, surfactants and/or surface active agents.

Chain-extending agents which may be employed in the preparation of the polyurethane foams of the invention include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl) ethylenediamine, N'N-di(2-dydroxypropyl)ethylenediamine, piperazine, and 2-methylpiperazine.

Any suitable catalyst or combination of catalysts may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyl dimethylamine, N,N,N'-trimethylisopropyl propylenediamine, 3-diethylaminopropyldiethylamine, dimethylbenzylamine, and the like. Other suitable catalysts include, for example, stannous octoate, stannous chloride, dibutyltin di-2-ethyl hexanoate, stannous oxide, as well as other organometallic compounds such as are disclosed in U.S. Pat. No. 2,846,408.

A surfactant or surface-active agent is generally necessary for production of high grade polyurethane foam according to the present invention, since in the absence of same, the foams may collapse or contain very large uneven cells. Numerous surface-active agents have been found satisfactory, with nonionic surface active agents being preferred. Of these, the well-known silicones have been found to be particularly advantageous. Other surface-active agents which are operative, include polyethylene glycol ethers of long chain alcohols, tertiary amine or alkanolamine salts of long chain alkyl acid sulfate esters, alkyl sulfonic esters, and alkyl arylsulfonic acids.

EXAMPLES

The scope of the invention is further described in connection with the following examples which are set forth for the sole purpose of illustrating the preferred embodiments of the invention and which are not to be construed as limiting the scope of the invention in any manner. In these examples, all parts given are by weight unless otherwise specified, while the density vaues are reported in pounds per cubic feet, the porosity values in cubic decimeters per second and the burn test in inches per minute. Unless otherwise specified, all references to melamine refer to the Pluragard ® material described above.

EXAMPLES 1-5

(Comparative)

A control sample was prepared from the following formulation:

| Component | parts by weight |
| --- | --- |
| polyether polyol* (3000 mw) | 100.0 |
| toluene diisocyanate (80/20) | 49.95 |
| water | 4.0 |
| stannous octoate catalyst | 0.22 |
| silicone surfactant | 1.0 |
| amine catalyst | 0.32 |

*Polyol 3010 from Dow Chemical

To this formulation, 5, 10, 15 and 20 parts melamine were added to form the foams of Examples 2-5, respectively. These foams were prepared at room temperature, and then tested for fire retardance with the following results.

| Property | Example | | | | |
|---|---|---|---|---|---|
| | 1 | 2 | 3 | 4 | 5 |
| Density | 1.59 | 1.58 | 1.58 | 1.60 | 1.61 |
| Porosity | 4.8 | 4.7 | 4.5 | 4.4 | 4.4 |
| MVSS-302 Burn test: | | | | | |
| Top | 8.1 | 8.0 | 6.4 | 4.0 | 1.3 SEO |
| Middle | 8.2 | 8.0 | 6.3 | 4.1 | 1.7 SEO |
| Bottom | 8.1 | 8.0 | 6.0 | 3.8 | 1.4 SEO |

The burn test samples denote those taken from the top, middle and bottom portions of the foam. The SEO rating is as defined in MVSS-302, i.e., a self-extinguishing zero burn material. Other ratings, such as SE-NBR, indicate a self-extinguishing no burn rate material. Where a letter designation is not used, the numbers in the table represent the burn rate of the sample in inches. As is evident from these results, melamine alone as a flame retardant is not effective unless used in an amount of at least about 20 parts based on 100 parts polyol.

EXAMPLES 6-8

To a control formulation similar to that of Example 1, except that 49 parts of toluene diisocyanate were used, 2 parts melamine and 5, 8 and 10 parts DE-60F (pentabromo diphenyl oxide), respectively, were added to prepare the foams of Examples 6-8. These foams were prepared and tested in the same manner as Examples 1-5. The results are illustrated below.

| Property | Example | | |
|---|---|---|---|
| | 6 | 7 | 8 |
| Density | 1.60 | 1.57 | 1.65 |
| Porosity | 5.1 | 4.0 | 4.5 |
| MVSS-302 Burn test*: | | | |
| Top | 1.4 | .8 | .7 |
| Middle | 1.0 | .7 | .8 |
| Bottom | .9 | .7 | .8 |

*all SE-O

EXAMPLES 9-11

Examples 6-8 were repeated except that a different flame retardant compound, Anti-blaze 80 ® tris (beta-chloropropyl) phosphate ("AB-80"), was used in the same amounts as Examples 6-8 along with the two parts of melamine.

| Property | Example | | |
|---|---|---|---|
| | 9 | 10 | 11 |
| Density | 1.68 | 1.63 | 1.75 |
| Porosity | 4.9 | 5.1 | 4.6 |
| MVSS-302 Burn test*: | | | |
| Top | 1.2 | 1.1 | 1.1 |
| Middle | 1.1 | 1.1 | 1.1 |
| Bottom | 1.1 | 1.2 | 1.0 |

*all SE-O

EXAMPLES 12-14

Examples 6-8 were repeated except that a different flame retardant compound, Anti-blaze 150 ® tetrakis (2-chloro ethyl) ethylene diphosphate ("AB-150"), was used along with the two parts of melamine. Results are as follows:

| Property | Example | | |
|---|---|---|---|
| | 12 | 13 | 14 |
| Density | 1.62 | 1.70 | 1.67 |
| Porosity | 4.0 | 4.1 | 3.5 |
| MVSS-302 Burn test*: | | | |
| Top | 1.4 | .8 | .8 |
| Middle | 1.2 | .8 | .6 |
| Bottom | 1.0 | .8 | .7 |

*all SE-O

EXAMPLES 15-17

Examples 6-8 were repeated except that a different flame retardant compound, Thermolin 101 ® tetrakis (2-chloro ethyl) ethylene diphosphate ("T-101"), was used along with the two parts of melamine. Results are as follows:

| Property | Example | | |
|---|---|---|---|
| | 15 | 16 | 17 |
| Density | 1.61 | 1.63 | 1.67 |
| Porosity | 3.9 | 4.1 | 3.5 |
| MVSS-302 Burn test*: | | | |
| Top | .8 | .6 | .7 |
| Middle | .9 | .7 | .7 |
| Bottom | 1.0 | .7 | .7 |

*all SE-O

EXAMPLES 18-20

Examples 6-8 were repeated except that a different flame retardant compound, D-836 (Great Lakes Chemical Corp.) as brominated-chlorinated phosphate ester, was used along with the two parts of melamine. Results are as follows:

| Property | Example | | |
|---|---|---|---|
| | 18 | 19 | 20 |
| Density | 1.63 | 1.60 | 1.64 |
| Porosity | 6.5 | 6.3 | 4.6 |
| MVSS-30 Burn test*: | | | |
| Top | 1.4 | .7 | .7 |
| Middle | 1.3 | .9 | .8 |
| Bottom | 1.1 | .7 | .7 |

*all SE-O

EXAMPLES 21-30

A base composition was prepared from the following formulation:

| Component | parts by weight |
|---|---|
| polyether polyol* (3000 mw) | 100.0 |
| toluene diisocyanate (80/20) | 49.0 |
| water | 4.0 |
| stannous octoate catalyst | 0.22 |
| silicone surfactant | 1.0 |
| amine catalyst | 0.32 |

*Polyol 3010 from Dow Chemical

To this formulation, various flame retardants were added alone, as well as with melamine to determine the effectiveness of the melamine substitution. Results are as shown in the following table:

| Flame Retardant Additive | Parts by weight in Example | | | | | | | | | |
|---|---|---|---|---|---|---|---|---|---|---|
| | 21 | 22 | 23 | 24 | 25 | 26 | 27 | 28 | 29 | 30 |
| AB-80 | 10 | 8 | — | — | — | — | — | — | — | — |
| TM-101 | — | — | 8 | 6 | — | — | — | — | — | — |
| AB-150 | — | — | — | — | 8 | 6 | — | — | — | — |
| D-836 | — | — | — | — | — | — | 5 | 4 | — | — |
| DE 60 F | — | — | — | — | — | — | — | — | 8 | 6 |
| Melamine | — | 2 | — | 2 | — | 2 | — | 2 | — | 2 |

These foams were prepared at room temperature, and then tested for fire retardance with the following results.

| Property | Example | | | | | | | | | |
|---|---|---|---|---|---|---|---|---|---|---|
| | 21 | 22 | 23 | 24 | 25 | 26 | 27 | 28 | 29 | 30 |
| Density | 1.60 | 1.61 | 1.63 | 1.64 | 1.59 | 1.60 | 1.60 | 1.59 | 1.58 | 1.58 |
| Porosity | 4.1 | 4.0 | 4.2 | 4.1 | 4.0 | 4.0 | 4.1 | 4.0 | 4.3 | 4.2 |
| MVSS-302 Burn test*: | | | | | | | | | | |
| Top | 1.3 | 1.2 | 1.3 | 1.2 | 1.4 | 1.2 | 1.4 | 1.2 | 1.5 | 1.4 |
| Middle | 1.0 | 1.1 | 1.1 | 1.0 | 1.2 | 1.1 | 1.2 | 1.1 | 1.3 | 1.2 |
| Bottom | 1.0 | 1.0 | 1.1 | 1.0 | 1.2 | 1.1 | 1.2 | 1.2 | 1.3 | 1.2 |

*All SEO

EXAMPLE 31

(Comparative)

A control sample was prepared from the following formulation:

| Component | parts by weight |
|---|---|
| polyether polyol* (3000 mw) | 100.0 |
| toluene diisocyanate (80/20) | 51.7 |
| water | 4.0 |
| stannous octoate catalyst | 0.25 |
| silicone surfactant | 1.0 |
| amine catalyst | 0.35 |
| Vircol 82 | 6.0 |

*Polyol 3010 from Dow Chemical

This foam was prepared at 72° F. and then tested for fire retardance with the following results.

| Property | Example 31 |
|---|---|
| Density | 1.56 |
| Porosity MVSS-302 | 3.0 |
| Burn test*: | |
| Top | 1.3 |
| Middle | 1.4 |
| Bottom | 1.2 |

*all SE-O

EXAMPLE 32

To a control formulation similar to that of Example 31, except that 51 parts of toluene diisocyanate were used, 10 parts melamine and 4 parts Vircol 82 were added. This foam was prepared and tested at 74° F. in the same manner as Example 31. The results are illustrated below.

| Property | Example 32 |
|---|---|
| Density | 1.72 |
| Porosity MVSS-302 | 4.02 |
| Burn test*: | |
| Top | 1.0 |
| Middle | 1.3 |
| Bottom | 1.4 |

*all SE-O

A slightly lower amount of toluene diisocyanate was used in Example 32 because of the lower amount of Vircol 82 which was used. This example shows the utility of the invention when melamine is substituted for a portion of a reactive flame retardant additive.

Since the Vircol 82 is reactive with the isocyanate component, a greater amount of melamine is required compared to that used with substantially non-reactive flame retardant additives. Generally, 4 to 10 parts melamine are necessary to replace between 2 to 4 parts of the reactive esters. Thus, the percentage of melamine replacement ranges from about 200 to 500 percent for this embodiment of the invention.

If desired, one skilled in the art could utilize reactive flame retardant additives in combination with non-reactive flame retardant additives, and such mixtures can be treated similarly under the teachings of this invention, i.e., a portion of one or both of the additives in the mixture can be replaced with melamine in the amounts previously described.

As is evident from the results of all these examples, melamine used in combination with the other flame retardant additives is more effective than the use of the same amount of the single flame retardant additive alone, or the use of melamine alone. As demonstrated by the examples, melamine must be used in an amount of about 20 parts by weight (based on 100 parts polyol) to be effective as a flame retardant additive, while the esters, when used alone, require between 5 to 10 parts or more to impart acceptable flame retardance properties to the foam.

While it is apparent that the invention herein disclosed is well calculated to fulfill the desired results, it will be appreciated that numerous modifications and embodiments may be devised by those skilled in the art, and it is intended that the appended claims cover all such modifications and embodiments as fall within the true spirit and scope of the present invention.

What is claimed is:

1. A method for maintaining the flame retardant properties of a flexible flame retardant polyether polyurethane foam prepared from a polyurethane foam-forming composition comprising a conventional, unmodified polyether polyol, an organic isocyanate compound, water, and a liquid phosphorous ester flame retardant additive which would normally be used in an amount of between 4 and 10 parts by weight based on 100 parts by weight of the polyether polyol, which method comprises:

replacing a minor portion of the amount of the liquid phosphorous ester flame retardant additive with an amount of melamine which is between about 15 to 300 percent of the minor portion of the additive to be replaced, said replacement amount of melamine being 10 parts by weight or less based on 100 parts by weight of the polyether polyol; and thereafter forming the foam from the melamine containing foam-forming composition to obtain a flexible foam having substantially the same flame retardance as one wherein a portion of the ester is not replaced with melamine.

2. The method of claim 1 wherein the amount of melamine ranges from 50 to 300 percent of the minor portion of the flame retardant additive to be replaced.

3. The method of claim 1 wherein the minor portion of the flame retardant additive is an amount of less than about 33 weight percent of the total amount of the additive.

4. The method of claim 2 wherein the minor portion of the flame retardant additive is an amount of less than about 25 weight percent of the additive to be replaced.

5. The method of claim 1 wherein the minor portion of the flame retardant additive ranges from between about 1 and 6 parts by weight based on 100 parts polyol.

6. The method of claim 5 wherein the replacement amount of m.leamine is between about 1 and 5 parts by weight based on 100 parts by weight polyol.

7. The method of claim 1 wherein the predetermined amount of flame retardant ranges from between about 1 and 2 parts by weight based on 100 parts polyol.

8. The method of claim 7 wherein the replacement amount of melamine is between about 1 and 3 parts by weight based on 100 parts by weight polyol.

9. The method of claim 1 wherein the flame retardant is reactive with the isocyanate compound, and wherein the amount of melamine ranges from about 200 to 500 percent of the minor portion to be replaced.

10. A method for maintaining the flame retardant properties of a flexible flame retardant polyurethane foam prepared from a polyurethane foam-forming composition comprising a conventional, unmodified polyether polyol, an organic isocyanate compound, water, and a liquid phosphorous ester flame retardant additive in an amount of at least about 8 parts by weight based on 100 parts by weight of the polyol, which method comprises:

replacing between about 1 to 6 parts by weight of the flame retardant additive with about 1 to 5 parts of melamine; and thereafter forming the flexible, flame retardant foam from the melamine containing foam-forming composition.

11. The method of claim 10 wherein between about 1 and 3 parts by weight of flame retardant is replaced with between about 1 and 3 parts of melamine.

12. The method of claim 10 wherein 2 parts of flame retardant is replaced with 2 parts of melamine.

13. A flexible flame-retardant polyurethane foam-forming composition comprising:

a conventional, unmodified polyether polyol;

an organic isocyanate compound;

water; and a flame retardant additive mixture comprising between about 1 and 5 parts by weight of melamine and between about 4 to 10 parts by weight of a liquid phosphorous ester flame retardant agent, said amounts based on 100 parts by weight of polyol in the composition.

14. The composition of claim 13 wherein the amount of melamine ranges from about 1 to 3 parts.

15. The composition of claim 14 wherein the amount of flame retardant agent ranges from about 4 to 8 parts.

16. The composition of claim 15 wherein the amount of melamine is about 2 parts.

17. The flexible flame retardant polyether polyurethane foam formed from the foam-forming composition of claim 13.

18. The flexible flame retardant polyether polyurethane foam formed by the method of claim 1.

19. The flexible flame retardant polyether polyurethane foam formed by the method of claim 10.

20. The flexible flame retardant polyether polyurethane foam formed by the method of claim 11.

21. A method for maintaining the flame retardant properties of a flexible flame retardant polyether polyurethane foam prepared from a polyurethane foam-forming composition comprising a conventional, unmodified polyether polyol, an organic isocyanate compound, water, and a reactive liquid phosphorous ester flame retardant additive which would normally be used in an amount of between 4 and 10 parts by weight based on 100 parts by weight of the polyether polyol, which method comprises:

replacing a minor portion of the amount of the reactive liquid phosphorous ester flame retardant additive with an amount of melamine which is between about 15 to 500 percent of the minor portion of the additive to be replaced, said replacement amount of melamine being 10 parts by weight or less based on 100 parts by weight of the polyether polyol; and thereafter forming the foam from the melamine containing foam-forming composition to obtain a flexible foam having substantially the same flame retardance as one wherein a portion of the ester is not replaced with melamine.

22. The method of claim 21 wherein between about 4 and 10 parts melamine are used to replace between about 2 and 4 parts of the reactive ester.

23. The flexible frame retardant polyurethane composition formed by the method of claim 21.

* * * * *